US005961307A

United States Patent [19]

Key et al.

[11] Patent Number: 5,961,307

[45] Date of Patent: Oct. 5, 1999

[54] PRESSURE PROPORTIONING REGULATOR VALVE AND VANE MACHINE INCLUDING SAME

[75] Inventors: Al Key, Kenesha; Gregory Lemke, Union Grove; Charles W. Meinke, Burlington; Ronald J. Schilling, Waterford, all of Wis.

[73] Assignee: Robert Bosch GmbH, Stuttgart, Germany

[21] Appl. No.: 08/906,563

[22] Filed: Aug. 5, 1997

[30] Foreign Application Priority Data

Aug. 8, 1996 [DE] Germany ........................ 296 13 700 U

[51] Int. Cl.[6] ............................ F01C 1/344; F01C 21/16; G05D 7/01

[52] U.S. Cl. ............................ 418/82; 418/268; 137/102

[58] Field of Search ..................... 418/82, 268; 137/102, 137/116.3

[56] References Cited

U.S. PATENT DOCUMENTS

| | | | |
|---|---|---|---|
| 2,632,398 | 3/1953 | Ferris | 418/82 |
| 3,516,768 | 6/1970 | Bolz et al. | 418/82 |
| 4,917,140 | 4/1990 | King et al. | 137/116.3 |

FOREIGN PATENT DOCUMENTS

| | | | |
|---|---|---|---|
| 1 96 31 974.9-42 | 8/1996 | Germany . | |
| 6207581 | 7/1994 | Japan | 418/268 |

*Primary Examiner*—John J. Vrablik
*Attorney, Agent, or Firm*—Michael J. Striker

[57] ABSTRACT

The simple and economical pressure proportioning regulator valve can maintain a constant pressure ratio of the pressure at its inlet (13) to the pressure in its outlet duct (14), especially during negative pressure changes at the inlet (13). The pressure proportioning regulator valve has a valve housing (11) provided with a throughgoing passage (12) having an inlet (13) and an outlet duct (14); a valve gate (22) in the throughgoing passage (12) having a pressing surface (43) acted on by a pressure at the inlet (13) and another pressing surface (44) acted on by a pressure in the outlet duct (14); a device for reducing both pressures while maintaining their pressure ratio including a first control edge (29) arranged on the valve gate (22) between the inlet (13) and the outlet duct (14) and a device for controlling a flow of a pressurized medium between the outlet duct (14) and the return duct (15) including a second control edge (30) provided on the control member (23) of the valve gate (22). This rapidly reacting pressure proportioning regulator valve (10) does not have a valve spring and thus is not subjected to wear and/or fatigue in the course of its life.

10 Claims, 3 Drawing Sheets

PRESSURE PROPORTIONING REGULATOR VALVE AND VANE MACHINE INCLUDING SAME

CROSS-REFERENCE

The present application discloses subject matter also present, at least in part, in co-pending U.S. patent application, Ser. No. 08/910,965, filed Aug. 7, 1997, entitled “Vane Pump or Motor”.

BACKGROUND OF THE INVENTION

The present invention relates to a pressure proportioning regulator and to a vane machine, i.e. a vane pump or motor including this pressure proportioning regulator.

The pressure proportioning regulator valve comprises a valve housing provided with a throughgoing passage having an inlet, a return duct and an outlet duct, a valve gate in the throughgoing passage having a pressing surface acted on by pressure at the inlet and another pressing surface acted on by pressure in the outlet duct and a device for reducing the pressures while maintaining a constant pressure ratio of the pressure at the inlet to the pressure at the outlet duct, the means for reducing the pressures including a first control edge arranged on the valve gate between the inlet and the outlet duct.

This type of pressure proportioning regulator valve is generally known and is used in hydraulic circuits for control of a pressure ratio between the pressure at the inlet and the pressure at a outlet duct of the valve and/or in the channels connected with it.

The known pressure proportioning regulator valve has a one-piece valve gate which has several shoulders or steps in its diameter and one control edge. It is comparatively complicated to build and correspondingly expensive to manufacture.

The valve gate is movably guided in a throughgoing passage in the housing of the pressure proportioning regulator valve. The throughgoing passage is connected by means of a by-pass duct with the inlet and the outlet duct. Thus the positive-going pressure changes at the inlet may be regulated.

In order to smoothly regulate negative-going pressure changes, an expensive duct with additional slider elements is required in the valve housing of this type of pressure proportioning regulator valve. This increases the assembly expense and the structural volume of the pressure proportioning regulator valve in addition to the number of components. Also a duct with a comparatively large number of angular sections lead to a restriction of the flow of pressurized medium by the pressure proportioning regulator valve. This type of flow damping or restriction is undesirable in many applications, because it leads to a delay in the response properties of the pressure proportioning regulator valve.

SUMMARY OF THE INVENTION

It is an object of the present invention to provide a pressure proportioning regulator valve of the above-described type which does not have the above-described disadvantages.

It is another object of the present invention to provide an improved pressure proportioning regulator valve having a two-part valve gate provided with a second control edge, which provides control for protecting a pressure equilibrium, even during negative pressure changes at the inlet as well as a return duct present in addition to the outlet duct of the valve housing.

It is a further object of the invention to provide an improved vane machine, i.e. a vane pump or vane motor, including the pressure proportioning valve according to the invention.

According to the invention, the pressure proportioning regulator valve comprises a valve housing provided with a throughgoing passage having an inlet and an outlet duct, a valve gate in the throughgoing passage having a pressing surface acted on by a pressure at the inlet and another pressing surface acted on by a pressure in the outlet duct, means for reducing these pressures while maintaining a constant pressure ratio of a pressure at the inlet to the pressure in the outlet duct, which means includes a first control edge arranged on the valve gate between the inlet and the outlet duct and means for controlling a connection between the outlet duct and the return duct and a flow of a pressurized medium between the outlet duct and the return duct, which includes a second control edge provided on the control member of the valve gate.

The valve gate in the pressure proportioning regulator valve according to the invention is divided into two parts consisting of a piston and a sliding control member connected to the piston, the pressing surfaces are on the control member and on the piston. The pressing surface on the piston is larger than and coaxial to the pressing surface on the control member and both pressing surfaces are in the throughgoing passage and cooperate with each other.

Both individual parts of the valve gate, which have different surfaces for pressure regulation having different sizes acted on by pressure, are comparatively simply made rotationally symmetric parts, which are arranged in a throughgoing passage in the valve housing acted on at both ends. The throughgoing passage is stepped or provided with portions or sections of differing diameters which conform to the diameter of the valve gate. The section of the throughgoing passage in the vicinity of the inlet is formed with a comparatively smaller diameter. Additional by-pass ducts apart from a connecting duct between the outlet duct and the throughgoing passage can be eliminated. Moreover a compact simply structured pressure proportioning regulator valve with reduced damping properties can react comparatively rapidly to pressure changes at the inlet.

The outlet duct and the return duct of the pressure proportioning regulator valve are assigned to and end in circular channels formed in the outer periphery of the valve housing, which extend in different planes arranged substantially parallel to each other and perpendicular to the throughgoing passage. These circular channels are sealed from the exterior and from each other. The pressure proportioning valve may be used without additional sealing elements in a suitable wall of an apparatus and with no separate structural chambers in the hydraulic circuit. Because of the omission of a valve spring, a reliable and fatigue-free operation of this type of pressure proportioning regulator valve is possible.

In a preferred embodiment of the invention the sliding control member is bone-shaped and has comparatively wider end portions at opposite ends thereof for guidance in the throughgoing passage and a central section of a comparatively smaller diameter relative to the end portions. Advantageously the first and second control edges are arranged on the central section and channels for pressurized medium flow are arranged at both end portions for connection of gaps with the inlet and/or outlet duct between the central section and the throughgoing passage and bounded by the first and second control edges.

Advantageously when the valve gate is in a neutral position the valve gate with its first and second control edges blocks a pressurized medium flow from the inlet to the outlet duct and/or from the outlet duct to the return duct.

Advantageously the pressure proportioning regulator valve includes means for controlling pressures on opposite ends of pump vanes of a vane pump, especially during the reversing stages of the vanes.

The invention also encompasses an improved vane machine in which the pressure proportioning valve is integrated in the housing of the vane machine. This pressure porportioning valve is designed to equalize the pressures and the opposite vane ends in the vane machine and thus reduce wear in the vane machine during operation.

The vane machine according to the invention includes a housing provided with an inlet connector and an outlet connector; a rotatably mounted rotor provided with a plurality of circumferentially distributed radial slots; a plurality of vanes each having two opposite ends and guided movably in the radial slots with their first ends inside the radial slots to form compression chambers in the rotor, while second ends of the vanes are located outside the radial slots; a cooperating mechanism wall on which the second ends of the vanes bear which moves each vane through a compression stage, a vacuum stage and two reversing stages during a revolution of the rotor to change respective compression chamber volumes; at least one housing-side compensation duct provided for a pressurized medium supplied to the compression chambers to permit a pressurized medium flow from the inlet connector to the outlet connector and the pressure proportioning valve according to the invention as described above. The pressure proportioning valve supplies the pressurized medium to the compression chambers at an intermediate pressure depending on the system pressure so as to maintain a constant pressure ratio of the intermediate pressure to the system pressure and the least one housing-side compensation duct is arranged so that the pressurized medium located in each compression chamber loads the ends of the vanes inside the radial slots with the intermediate pressure when each vane passes through at least one reversing stage. pressure when each vane passes through at least one reversing stage.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
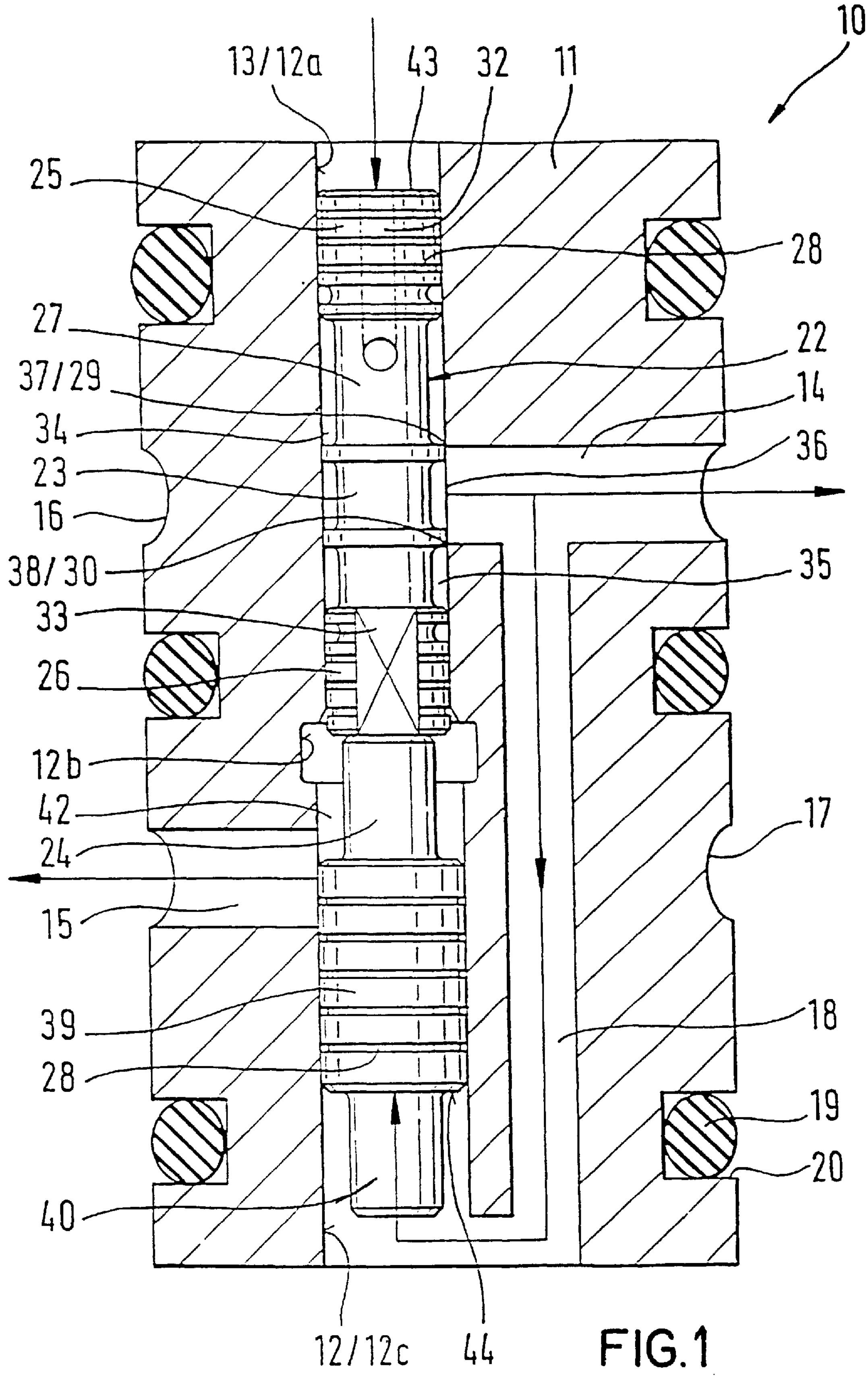
FIG. 1 is a longitudinal cross-sectional view of a pressure proportioning regulator according to the invention.

The pressure proportioning regulator valve 10 shown in detail in the drawing has a cylindrical valve housing 11 with a throughgoing passage 12 arranged eccentrically in the valve housing 11. The throughgoing passage 12 extends parallel to the longitudinal axis of the pressure proportioning regulator valve 10 and consists of three sections 12*a*, 12*b* and 12*c* with different internal diameters. The beginning section 12*a* at the first end of the valve housing 11 has the smallest inner diameter and forms the inlet 13 for the pressure proportioning regulator valve 10. The beginning section 12*a* connects with a short central section 12*b* which has the largest inner diameter of the three sections and which continues into the final section 12*c*. This final section 12*c* extends to the second end of the pressure proportioning regulator valve 10 and has an inner diameter which is between that of beginning section 12*a* and that of the central section 12*b*.

An outlet duct 14 is connected to the throughgoing passage 12 in the vicinity of the beginning section 12*a* and a return duct 15 is connected to the throughgoing passage 12 in the vicinity of the final section 12*c*. The outlet duct 14 and return duct 15 are assigned to or end in circumferential ducts 16,17 formed in the outer periphery of the valve housing 11. The circumferential ducts 16,17 are circular and extend in different parallel planes which are substantially perpendicular to the throughgoing passage 12 with the duct 17 assigned to the return duct 15 closer to the second end of the housing 11 than the duct 16. The outlet duct 14 is also connected the throughgoing passage 12 by means of a longitudinal connecting duct 18 arranged parallel to the throughgoing passage 12 and together with the throughgoing passage forms a U-bend in the passage at the second end of the pressure proportioning regulator valve 10.

The outlet duct 14 and the return duct 15 are sealed from the outside by sealing members 19 which are inserted in the circumferential sealing grooves 20 in the valve housing.

A valve gate 22 is movably guided in the throughgoing passage 12 to regulate the pressure ratio between the pressure level at the inlet 13 and that in the outlet duct 14 of the pressure proportioning regulator valve 10. The valve gate 22 comprises a sliding control member 23 and a piston 24. Their outer diameters conform to the diameter of the beginning section 12*a* and/or the end or final section 12*c* of the throughgoing passage 12, in which they are guided.

The sliding control member 23 is bone-shaped and has two end portions 25,26 having comparatively larger outer diameters and a central region 27 having a comparatively smaller outer diameter. Both ends portions 25, 26 act to guide the control member 23 in the throughgoing passage 12 and are equipped with circumferential lubricating grooves 28. Two control edges 29,30 are formed on the central section 27 of the control member 23. Openings 32,33 in the form of passages and/or provided by flattened portions on both end portions provide for the inflow and outflow of a pressurized medium in or out from gaps 34,35 bounded by the walls of the throughgoing passage 12, by the central section 27 of the control member 23 and the control edges 29,30. The arrangement and the spacing of the control edges 29,30 relative to each other conforms to the position and/or the diameter of the outlet duct 14 opening into the beginning section 12*a* of the throughgoing passage 12. The edge 36 at the opening of the outlet duct 14 in the wall of the throughgoing passage 12 forms an inlet-side control throttle 37 together with the control edges 29,30 in the valve gate 30, as well as a return-side control throttle 38 coupled with it. Both control throttles 37,38 are closed in the neutral position of the valve gate 30.

The piston 24 has a guiding part 39 conforming in its outer diameter to the largest inner diameter of the throughgoing passage 12, which is provided with circumferential lubricating grooves 28 for improving the sliding properties of the piston 24 in the throughgoing passage 12. Connecting elements 40 smaller in their outer diameter than the guiding part 39 are connected on either side of it in the longitudinal direction to the guiding part 39. The piston 24 is connected by one of the connecting elements 40 to the sliding control member 23 at a connecting position in a plane which extends perpendicularly to the control member in the vicinity of the central section 12*b* of the throughgoing passage 12. The length of the connecting element 40 and/or the position of the return duct 15 of the pressure proportioning regulator valve 10 are designed so that a passage 42 exists between the central section 12*b* of the throughgoing passage 12 and the return duct 15 in the valve housing 11.

This type of pressure proportion valve 10 regulates to provide a constant, i.e. independent of the level of the pressure at the inlet 13, pressure ratio between the pressure at the inlet 13 and the pressure in the outlet duct 14 in a hydraulic circuit.

Figure 2:
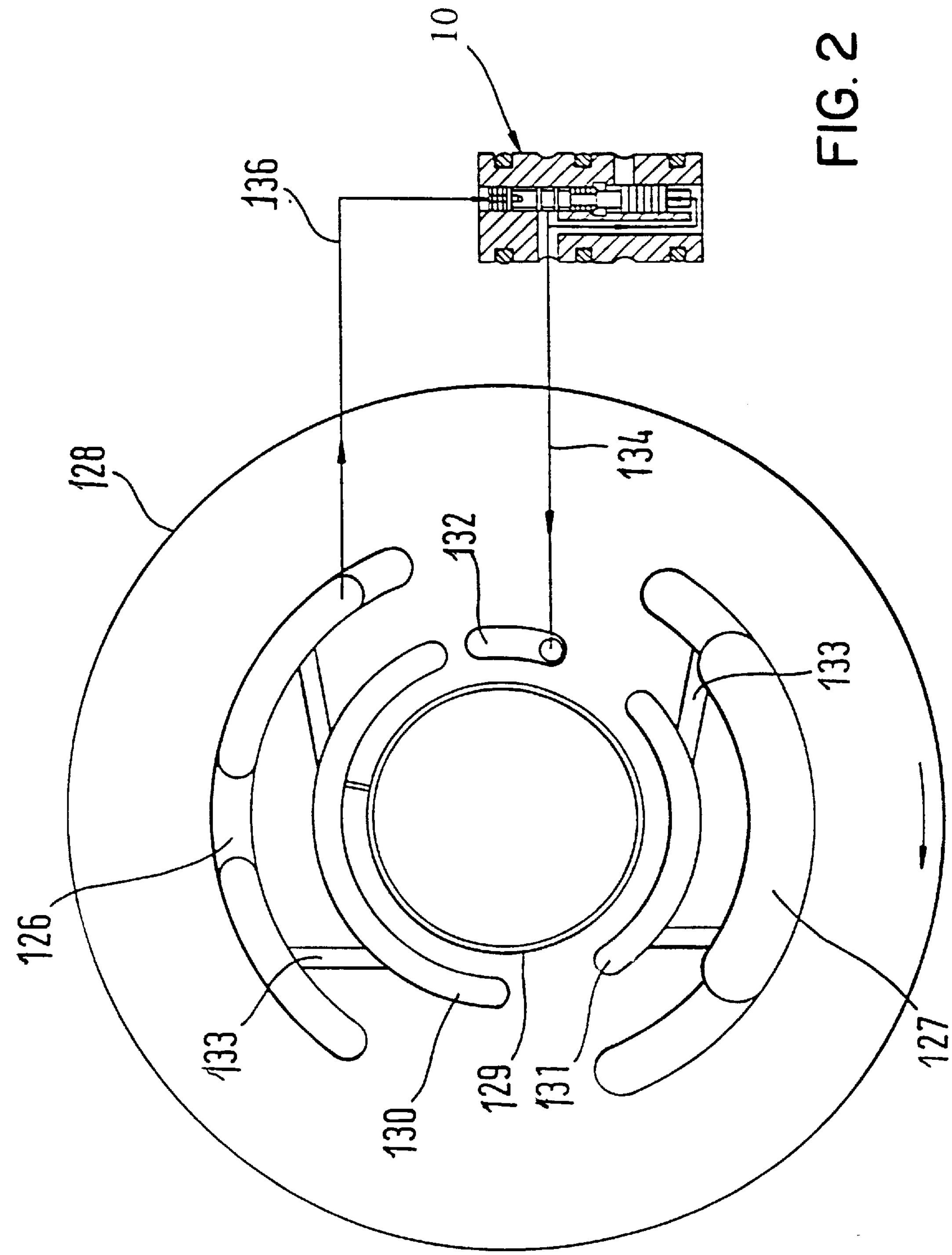
FIG. 2 is a diagrammatic cross-sectional view of a vane machine including the pressure proportioning regulator of FIG. 1 for controlling pressures on its vanes.
Figure 3:
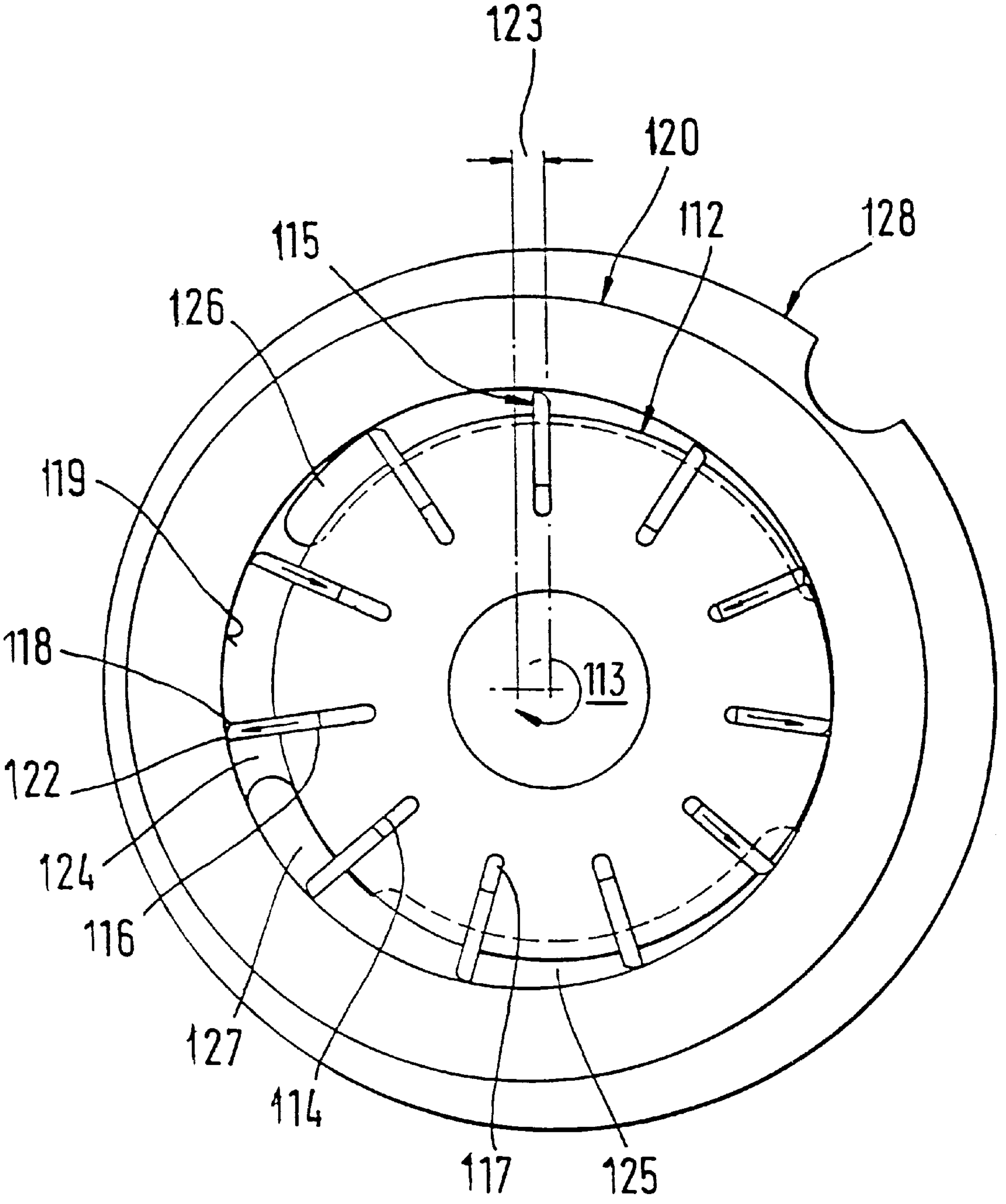
FIG. 3 is a diagrammatic front view of the vane machine of FIG. 2.

FIG. 3 shows a vane machine which can be controlled by the pressure proportioning valve according to the invention. This vane machine is built into a recess in a machine housing, which is not shown except for its cover, in a manner which is generally known. The pump has a rotor 112, which is nonrotatably mounted on a torque transmitting shaft 113 and rotates together with it in a clockwise direction. The rotor 112 has radial slots 114 arranged around its circumference spaced at equal angular intervals from each other, in which the vanes 115 are located. The compression chambers 117 in the rotor 112 are bounded by the walls of the radial slots 114 and the first ends 116 of the vanes 115 which are inside the rotor 112. The second ends 118 of the vanes 115 opposite to the first ends and projecting from the radial slots 114 brace themselves on an interior mechanism wall 119 of a lift ring 120, which embraces or surrounds the outer circumference of the rotor 112. These second ends 118 have a front surface facing in the direction of rotation of the rotor 112 and thus contact on the lift ring 120 along small sealing contact lines 122. The lift ring 120 is radially slidable relative to the rotor 112 so that an eccentricity 123 is continuously adjustable between it and the rotor 112. The sickle-shaped gap 124 arising because of this eccentricity 123 between the rotor 112 and the lift ring 120 is subdivided into individual working chambers 125 by the vanes 115. In the course of a rotation of the rotor 112 these working chambers 125 experience, because of a lifting motion, a volume change due to forced motion of the vanes 115 by the eccentrically mounted lift ring 120. This volume change produces an under-pressure or an over-pressure in the working chambers, by means of which a pressurized medium flows from an unshown inlet to an outlet connector which are connected with the working chambers 125 by unshown connection ducts, which open into reniform flow grooves 126,127 shown in FIG. 2. These reniform flow grooves 126,127 are formed on an interior side portion of a cover 128 facing the rotor 112. The cover 128 of the housing closes the working chambers 125 and the front side of the housing recess. The flow grooves extend independently of each other in their longitudinal direction along a common circular path around the central axis of the rotor 112. The radius of this circular path thus conforms to the position of the gap 124 between the lift ring 120 and the rotor 112. Both flow grooves 126,127 extend over a distance of about four working chambers in their longitudinal direction.

As FIG. 2 shows three compensation grooves 130,131,132 are formed in the inner surface of the cover 128 facing the rotor 112 adjacent both flow grooves 126,127. These compensation grooves 130,131,132 are spaced from each other and extend along a common circular arc. This circular arc is concentric to the circular arc passing through the flow grooves 126,127. The radius of the circular arc on which the compensation grooves 130,131,132 lie is smaller than that of the circular arc on which the flow grooves 126,127 lie and is selected so that the compensation grooves 130,131,132 can cooperate with the compression chambers 117 of the rotor 112.

The dimensions of the flow grooves 126,127 and the compensation grooves 130,131,132 and their position relative to each other is determined by the direction in which the lift ring 120 is shiftable relative to the rotor 112 and by the rotation direction of the rotor 112. A revolution of the rotor 112 divides itself into a vacuum stage, a compression stage and two intervening reversing stages for the vanes 115. Different mechanical and hydraulic forces are applied to the vanes according to these various stages. The arrangement and structure of the flow grooves 126,127 and/or the compensation grooves 130,131,132 is designed to obtain a balancing of the forces on the vanes 15 during rotation of the rotor 112. Because of that, an expansion of the operating range of the vane machine to higher system pressures is possible.

In the vacuum or suction stage, in which vanes 115 are located first at their interior turning points and then move from there in the direction of their outer turning points, the flow groove 127 is coupled with the vacuum or suction side connector of the vane machine. This flow groove 127 begins about 30 degrees after the inner turning points of the vanes 115 and ends about 20 degrees before their outer turning points.

The compensation groove 131 is connected with the flow groove 127 by means of connecting ducts 133. Because of that, a common vacuum-side pressure is present in the flow duct 127 and in the compensation groove 131. The compensation groove 131 begins in the rotation direction of the rotor at about 15 degrees after the start of the flow groove 127 and ends about 15 degrees before the end of the flow groove 127.

In the intervening reversing stage following the vacuum or suction stage the vanes 115 pass over the flow groove 127 and the compensation groove 131 coupled with it and move further in the direction of their outer turning points.

The subsequent compression stage begins when this outer turning point is exceeded. The compression chambers 117 of the rotor 112 are first connected with the compensation groove 130, in which the higher pressure on the compression-side connector of the vane machine is present. Because of that the vanes 115 are brought into contact with the lift ring 120.

Because of the eccentricity between the lift ring 120 and the rotor 112 the vanes move further in the direction of their inner turning points. The flow groove 126 is thus effectively connected with the pressurized connector of the vane machine. The flow groove 126 begins about 30 degrees after the compensation groove 130 in the direction of the rotor 112. The end of the flow groove 126 and the end of the compensation groove 130 are located at the same position in the rotation direction, about 15 degrees in front of the inner turning points of the vanes 115. A closed circular groove 129 is connected with the compensation groove 130. The high pressure in this circular groove 129 presses the rotor 112 against the machine housing and seals the working chambers 125 because of that. The circular groove 129 is concentric to the compensation grooves 130, 131, 132 and has a smaller radius than those grooves.

The compression stage adjoins a second reversing stage for the vanes 115. In this second reversing stage the outer ends 118 of the vanes 115 pass over the end of the flow groove 126 and/or that of the compensation groove 130 and are located just in front of their inner turning points. Now the compensation groove 132 is in operation. It is connected to the compensation groove 130 with a comparatively small spacing in the rotation direction of the rotor 112 and is supplied with pressurized medium from the pressure proportioning valve 10 shown in FIG. 1.

The outlet duct 14 of the pressure proportioning valve 10 is connected to the compensation groove 132 via a schematically illustrated connecting line 134. The inlet 13 of this valve according to the invention, which is designed for control of the pressure level in the compensation groove 132, is connected by a connecting line 136 with the flow groove 126 for return of the pressurized medium to the valve from the vane machine.

The operation of the pressure proportioning regulator valve 10 according to the invention is described in greater detail in the following. This description assumes that the system pressure supplied thus far from the unshown hydraulic pressure generator has changed in the direction of a higher pressure value.

The increased system pressure acts on a first pressing surface 43 of the valve gate 22 of the pressure proportioning regulator valve via the connection line 136 FIG. 2) and moves it out from its neutral position because of the higher pressure due to the size of the pressing surface 43. The inlet-side control throttle 37 closed in the neutral position opens. Because of that, a pressurized medium flows through the longitudinal connecting duct 32 to the inlet-side end section 25 of the control member 23 into the intervening gap 34 and from there flows after being throttled, i.e. at reduced pressure, to the outlet duct 14 and into the connecting line 134 and/or to the longitudinal connecting duct 18. Since the longitudinal connecting duct 18 is connected at the foot end of the pressure proportioning regulator valve 10 with the throughgoing passage 12, the pressure in the longitudinal connecting duct 18 acts on a second outwardly facing pressing surface 44 of the valve gate 22. The pressure differences arising between the first and the second pressuring surfaces of the valve gate 22, because of the area differences due to the different diameters, change the position of the valve gate 22 and thus the cross-section of the inlet-side control throttle 37 until the forces on the valve gate 22 again balance. When the forces balance, the valve gate 22 is located again in its neutral position, i.e. the control throttles 37,38 are again closed and the pressure ratio between the pressure at the inlet 13 and the pressure at the outlet duct 14 is again produced. This pressure ratio is inversely proportional to the ratio between the first and the second pressing surface areas of the valve gate 22. Although the system pressure and also the control pressure now both have a higher pressure value than before, the ratio between the system pressure and the control pressure remains unchanged.

In case of a reduction of the system pressure produced by the pressure generator, the pressing force on the first pressing surface of the valve gate 22 is correspondingly reduced. The balancing or equilibrium of the forces on the valve gate 22 disturbed by that leads to a position change of the valve gate 22 in the direction of the first end of the valve housing 11. Because of that, the return-side control throttle 38 opens. The pressurized medium located in the outlet duct 14 flows through the control throttle 38 into the gap and from there along the flattened portion 33 into the central section **12*b* of the throughgoing passage 12. From there the pressurized medium reaches the return duct 15 along the passage or gap 42 between the connecting element 40 of the piston 24 and the wall of the throughgoing passage 12. The pressurized medium flowing away reduces the pressure in the outlet duct 14 and correspondingly in the longitudinal connecting duct 18. Because of that, also the pressing force on the second pressing surface 44 of the valve gate 22 is reduced. The regulating motion is ended when the forces on the valve gate 22 are in equilibrium. In this condition both control throttles 37,38 are again closed by the control edges 29,30**. The inlet pressure as well as the outlet pressure now take values which are lower than previously, however the ratio between the pressures remains constant.

The disclosure in German Patent Applications 296 13 700.6 and 196 31 974.9-42 both of Aug. 8, 1996 is incorporated here by reference. The invention described hereinabove and claimed in the claims appended hereinbelow is also described in this German Patent application which forms the basis for a claim of priority under 35 U.S.C. 119.

While the invention has been illustrated and described as embodied in a pressure proportioning regulator and a vane machine including it, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims:

1. A pressure proportioning regulator valve comprising a valve housing (11) provided with a throughgoing passage (12) having an inlet (13), a return duct (15) and an outlet duct (14);

a valve gate (22) guided movably in the throughgoing passage (12), said valve gate (22) having a pressing surface (43) acted on by a pressure at the inlet (13) and another pressing surface (44) acted on by a pressure in the outlet duct (14);

means for reducing said pressures while maintaining a constant pressure ratio of said pressure at said inlet (13) to said pressure at said outlet duct (14), said means for reducing said pressures including a first control edge (29) arranged on the valve gate (22) between the inlet (13) and the outlet duct (14);

means for controlling a connection between the outlet duct (14) and the return duct (15) and a flow of a pressurized medium between the outlet duct (14) and the return duct (15), said means for controlling comprising a second control edge (30) provided on the valve gate (22);

wherein the valve gate (22) is divided into two parts consisting of a piston (24) and a sliding control member (23), said pressing surface (43) and said second control edge (30) are arranged on said sliding control member (23), said another pressing surface (44) is provided on said piston (24), said another pressing surface (44) is larger than and coaxial to said pressing surface (43) and said pressing surfaces (43,44) are arranged in said throughgoing passage (12).

2. The pressure proportioning regulator valve as defined in claim 1, wherein said sliding control member (23) is bone-shaped and has comparatively wider end portions (25,26) at opposite ends thereof for guidance in the throughgoing passage (12) and a central section (27) of a comparatively smaller diameter relative to said end portions, and said first and second control edges (29,30) are arranged on said central section (27).

3. The pressure proportioning regulator valve as defined in claim 1, wherein the control member (23) is provided with channels (32,33) for a flow of the pressurized medium at both of said end portions (25,26) and said channels connect at least one of the inlet (13) and the outlet duct (15) to gaps (34,35) provided between the central section (27) and the throughgoing passage (12), said gaps (34,35) being bounded by said first and second control edges (29,30).

4. The pressure proportioning regulator valve as defined in claim 1, wherein said valve gate (22) is formed with said first and second control edges (29,30) arranged to block a pressurized medium flow from the inlet (13) to the outlet duct (14) in a neutral position in the throughgoing passage.

5. The pressure proportioning regulator valve as defined in claim 1, wherein said valve gate (22) is formed with said first and second control edges (29,30) to block said pressurized medium flow from the outlet duct (14) to the return duct (15) in a neutral position in the throughgoing passage.

6. The pressure proportioning regulator valve as defined in claim 1, wherein said valve gate (22) is formed with said first and second control edges (29,30) arranged to block said pressurized medium flow from the outlet duct (14) to the return duct (15) and from the inlet (13) to the outlet duct (14) in a neutral position in the throughgoing passage.

7. The pressure proportioning regulator valve as defined in claim 1, wherein the valve housing (11) has an outer peripheral surface provided with circular circumferential channels (16,17), each of said circular channels (16,17) extends in a different substantially parallel plane passing substantially perpendicularly through said throughgoing passage (12), said outlet duct (14) ends in one of said circular channels, said return duct (15) ends in another of said circular channels and said plane in which said return duct (15) extends is further from said inlet (13) than said plane in which said outlet duct (14) extends.

8. The pressure proportioning regulator valve as defined in claim 1, wherein the inlet (13) is located at one end of the valve housing (11) and opens directly into the throughgoing passage (12).

9. The pressure proportioning regulator valve as defined in claim 1, wherein the valve gate (22) does not include a valve spring.

10. A vane machine comprising a housing provided with an inlet connector and an outlet connector; a rotatably mounted rotor (112) provided with a plurality of circumferentially distributed radial slots (114); a plurality of vanes (15) each having a first end (116) and a second end (118) opposite the first end, each of said vanes (115) being guided movably in one of the radial slots (114) with the first end thereof inside said radial slot to form a compression chamber (117) therein bounded by walls of said radial slot, and the second ends (118) of said vanes being located outside the radial slots; a mechanism wall (119) on which said second ends (118) bear to move each of the vanes in the radial slots through a compression stage, a vacuum stage and two reversing stages during a revolution of the rotor (112) thus changing a volume of each of the compression chambers (117); at least one housing-side compensation duct (132) provided for a pressurized medium supplied to the compression chambers (117) to permit a flow of the pressurized medium from the inlet connector to the outlet connector and a pressure proportioning valve (10) for supplying the pressurized medium to the compression chambers (117) at an intermediate pressure depending on the system pressure so as to maintain a constant pressure ratio of the intermediate pressure to the system pressure, the least one housing-side compensation duct (132) being arranged so that the pressurized medium located in each of the compression chambers (117) loads the first ends (116) of said vanes with the intermediate pressure when each of said vanes passes through at least one of the two reversing stages;

wherein said pressure proportioning valve comprises a valve housing (11) provided with a throughgoing passage (12) having an inlet (13), a return duct (15) and an outlet duct (14), said outlet duct (14) being connected with said at least one compensating duct (132) and said inlet (13); a valve gate (22) guided movably in the throughgoing passage (12), said valve gate (22) having a pressing surface (43) acted on by a pressure at the inlet (13) and another pressing surface (44) acted on by a pressure in the outlet duct (14); and means for reducing said pressures while maintaining a constant pressure ratio of said pressure at said inlet (13) to said pressure at said outlet duct (14), said means for reducing said pressures including a first control edge (29) arranged on the valve gate (22) between the inlet (13) and the outlet duct (14); means for controlling a connection between the outlet duct (14) and the return duct (15) and a flow of a pressurized medium between the outlet duct (14) and the return duct (15), said means for controlling comprising a second control edge (30) provided on the valve gate (22); wherein the valve gate (22) is divided into two parts consisting of a piston (24) and a sliding control member (23), said pressing surface (43) and said control edge (30) are arranged on said sliding control member (23), said another pressing surface (44) is provided on said piston (24), said another pressing surface (44) is larger than and coaxial to said pressing surface (43) and said pressing surfaces (43,44) are arranged in said throughgoing passage (12).

* * * * *